(12) United States Patent
Callahan et al.

(10) Patent No.: US 7,520,520 B2
(45) Date of Patent: Apr. 21, 2009

(54) BICYCLE FORK ASSEMBLY

(75) Inventors: Jean-Luc Callahan, San Jose, CA (US); Christopher Paul D'Aluisio, Watsonville, CA (US)

(73) Assignee: Specialized Bicycle Components, Inc., Morgan Hill, CA (US)

( * ) Notice: Subject to any disclaimer, the term of this patent is extended or adjusted under 35 U.S.C. 154(b) by 357 days.

(21) Appl. No.: 11/370,750

(22) Filed: Mar. 8, 2006

(65) Prior Publication Data

US 2007/0210554 A1    Sep. 13, 2007

(51) Int. Cl.
*B62K 21/18* (2006.01)
(52) U.S. Cl. .................... 280/276; 280/279; 280/280
(58) Field of Classification Search ............. 280/276, 280/279, 280
See application file for complete search history.

(56) References Cited

U.S. PATENT DOCUMENTS

| | | | |
|---|---|---|---|
| 2,010,173 A | 8/1935 | Anderson | |
| 4,189,167 A * | 2/1980 | Dubois | 280/279 |
| 4,662,645 A * | 5/1987 | McMurtrey | 280/279 |
| 4,887,828 A * | 12/1989 | Chonan | 280/280 |
| 5,405,202 A * | 4/1995 | Chi | 384/545 |
| 5,860,666 A | 1/1999 | Akamatsu | |
| 5,865,069 A * | 2/1999 | Edwards | 74/551.1 |
| 5,964,474 A * | 10/1999 | Chen | 280/279 |
| 6,231,063 B1 * | 5/2001 | Chi | 280/279 |
| 6,254,115 B1 * | 7/2001 | Lin | 280/279 |
| 6,651,525 B2 * | 11/2003 | Jiang | 74/551.1 |
| 6,729,634 B2 * | 5/2004 | Tange | 280/279 |
| 6,883,818 B1 * | 4/2005 | Chiang | 280/279 |
| 2005/0012299 A1* | 1/2005 | Schuman et al. | 280/288.3 |

* cited by examiner

*Primary Examiner*—Paul N Dickson
*Assistant Examiner*—Michael R Stabley
(74) *Attorney, Agent, or Firm*—Michael Best & Friedrich LLP

(57) ABSTRACT

A bicycle fork assembly that includes a fork having a fork crown, a steerer tube, and a transition that couples the fork crown to the steerer tube to define a transition point between the transition and the steerer tube. The transition has an outer dimension that increases from the steerer tube toward the fork crown. A bearing is configured to rotatably support the fork within a head tube of a bicycle frame, and the bearing is located adjacent the transition point.

11 Claims, 4 Drawing Sheets

BICYCLE FORK ASSEMBLY

BACKGROUND

The present invention relates to a fork assembly for a bicycle. More particularly, the invention relates to a fork and a lower bearing assembly configured for use in the fork assembly.

Most bicycles include a front fork that is rotatable to turn a front wheel. The fork typically includes two fork blades, and the front wheel is rotatably supported between the two fork blades. The fork blades are coupled at one end to form a crown, and a steerer tube typically extends from the crown. The steerer tube is rotatably supported within a head tube by at least two bearings, an upper bearing and a lower bearing. The head tube is coupled to and comprises a portion of a frame of the bicycle, and the bearings allow the fork to rotate relative to the head tube and frame. Generally, a handle bar is attached to the steerer tube to allow a rider to rotate the fork and steer the bicycle.

SUMMARY

The present invention provides a bicycle fork assembly that includes a fork having a fork crown, a steerer tube, and a transition that couples the fork crown to the steerer tube. A transition point is defined between the transition and the steerer tube, and the transition has an outer dimension that increases from the steerer tube toward the fork crown. A bearing is configured to rotatably support the fork within a head tube of a bicycle frame, and the bearing is located adjacent the transition point.

The present invention also provides a bicycle fork and frame assembly that includes a frame, a fork, an upper bearing, and a lower bearing. The fame includes a head tube with an outer dimension. The fork includes a fork crown and a steerer tube positioned in the head tube. The lower bearing has a diameter and the upper and lower bearings are configured to rotatably support the fork within the head tube. The head tube includes a first end proximal to the crown and a second end distal to the crown. A ratio is defined by a distance from the first end of the head tube to the lower bearing divided by the diameter of the lower bearing, and the ratio is at least about 0.25.

The present invention a bicycle that includes a frame having a head tube, a fork, and a lower bearing. The fork includes a fork crown having a brake mount, a steerer tube, and a transition that couples the fork crown to the steerer tube and defines a transition point between the transition and the fork crown. The transition has an outer dimension that increases from the steerer tube toward the fork crown. The lower bearing is recessed within the head tube and is configured to rotatably support the fork within the head tube. The brake mount is a distance from the lower bearing. A ratio is defined as the distance from the brake mount to the lower bearing divided by an outer dimension of the transition at the transition point, and the ratio is at least about 0.5.

Other aspects of the invention will become apparent by consideration of the detailed description and accompanying drawings.

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways. Also, it is to be understood that the phraseology and terminology used herein is for the purpose of description and should not be regarded as limiting. The use of "including," "comprising," or "having" and variations thereof herein is meant to encompass the items listed thereafter and equivalents thereof as well as additional items. Unless specified or limited otherwise, the terms "mounted," "connected," "supported," and "coupled" and variations thereof are used broadly and encompass both direct and indirect mountings, connections, supports, and couplings. Further, "connected" and "coupled" are not restricted to physical or mechanical connections or couplings.

DETAILED DESCRIPTION

Figure 1:
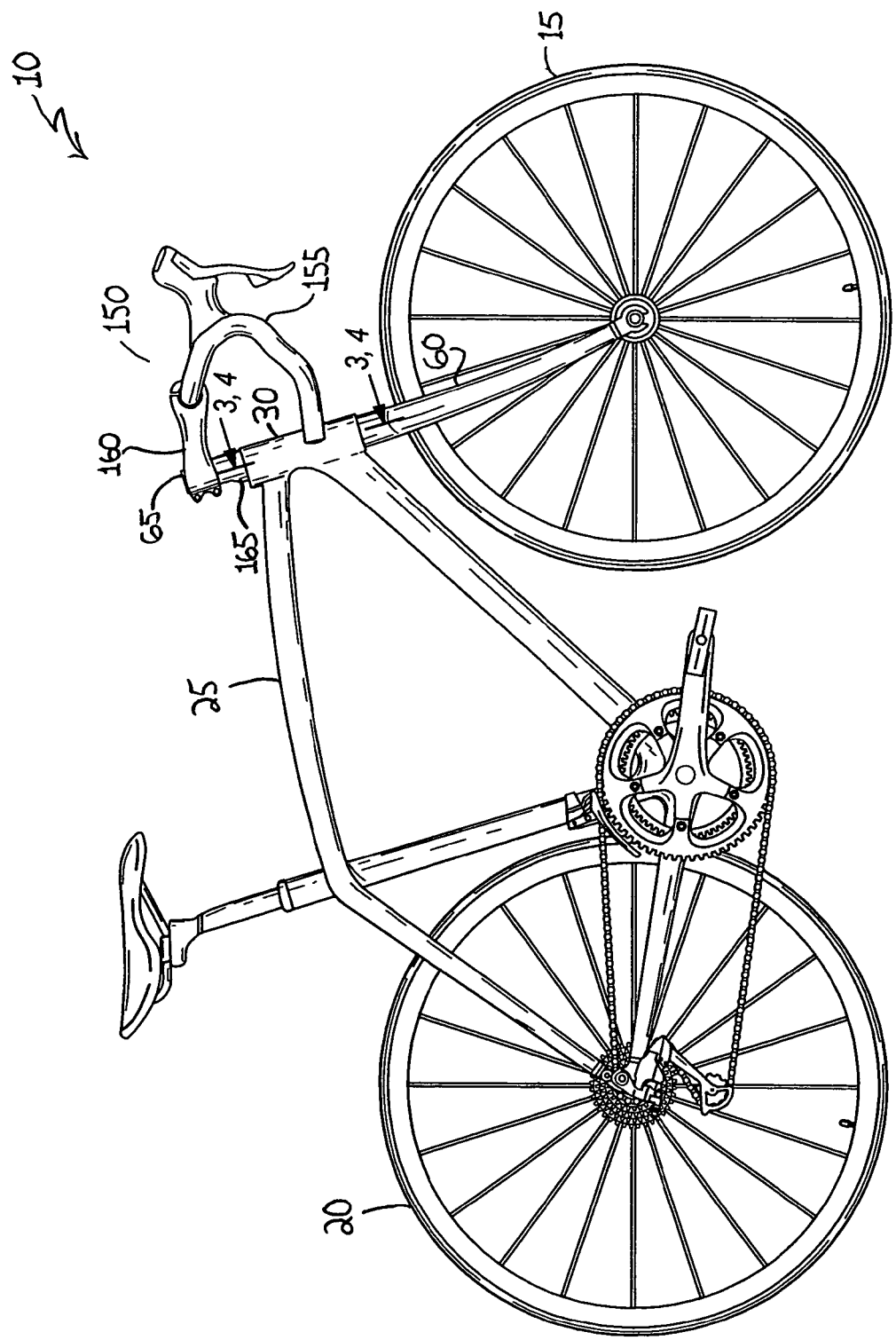
FIG. 1 is a side view of a bicycle including a fork assembly embodying the present invention.

FIG. 1 illustrates a bicycle 10 that includes a front wheel 15, a rear wheel 20, and a frame 25. The frame 25 can be made from any suitable material, such as steel, aluminum, carbon/epoxy composite, KEVLAR composite, fiberglass composite, or other composites and the like.

Figure 2:
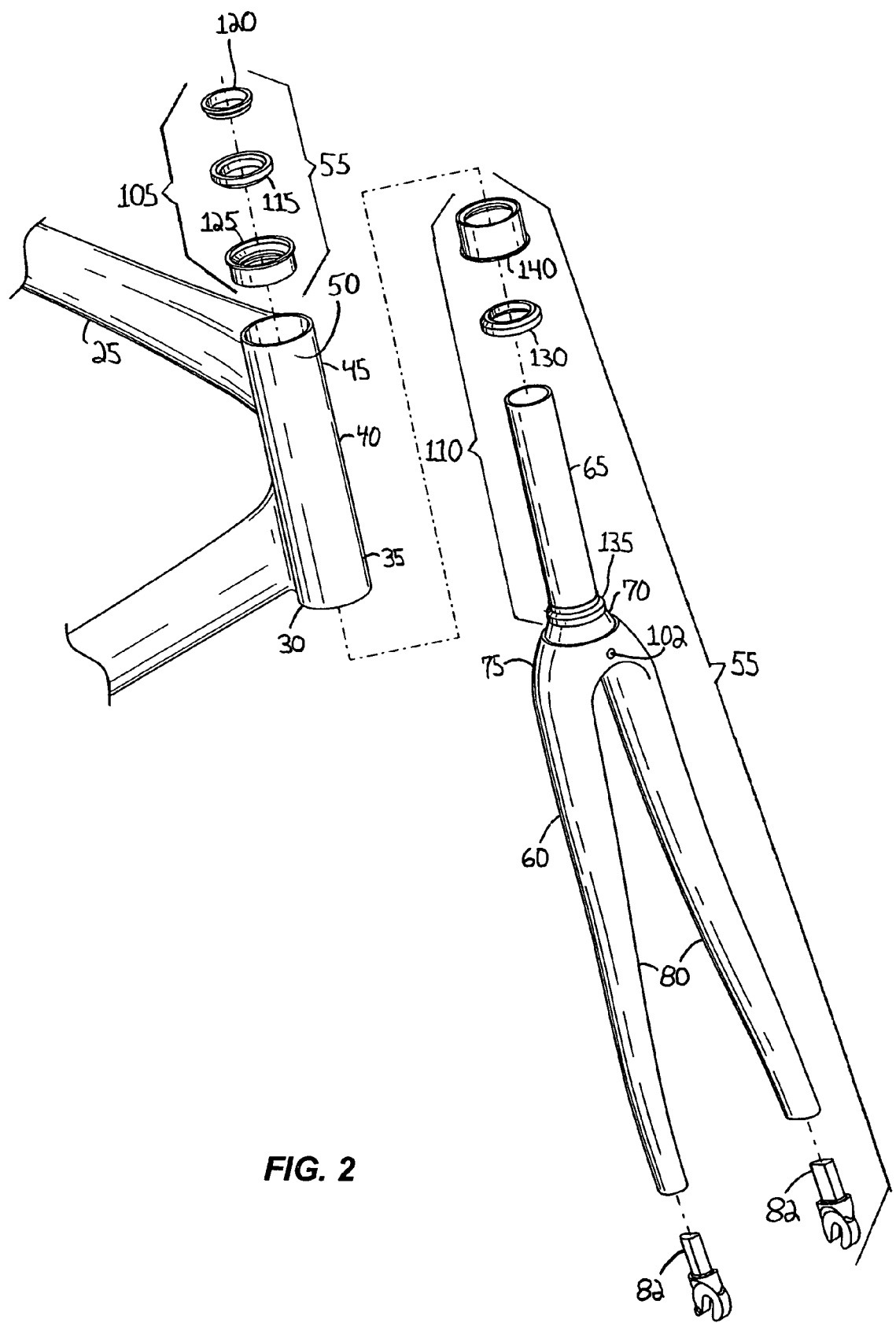
FIG. 2 is an exploded view of the fork assembly of FIG. 1 and a portion of the frame of the bicycle of FIG. 1.
Figure 4:
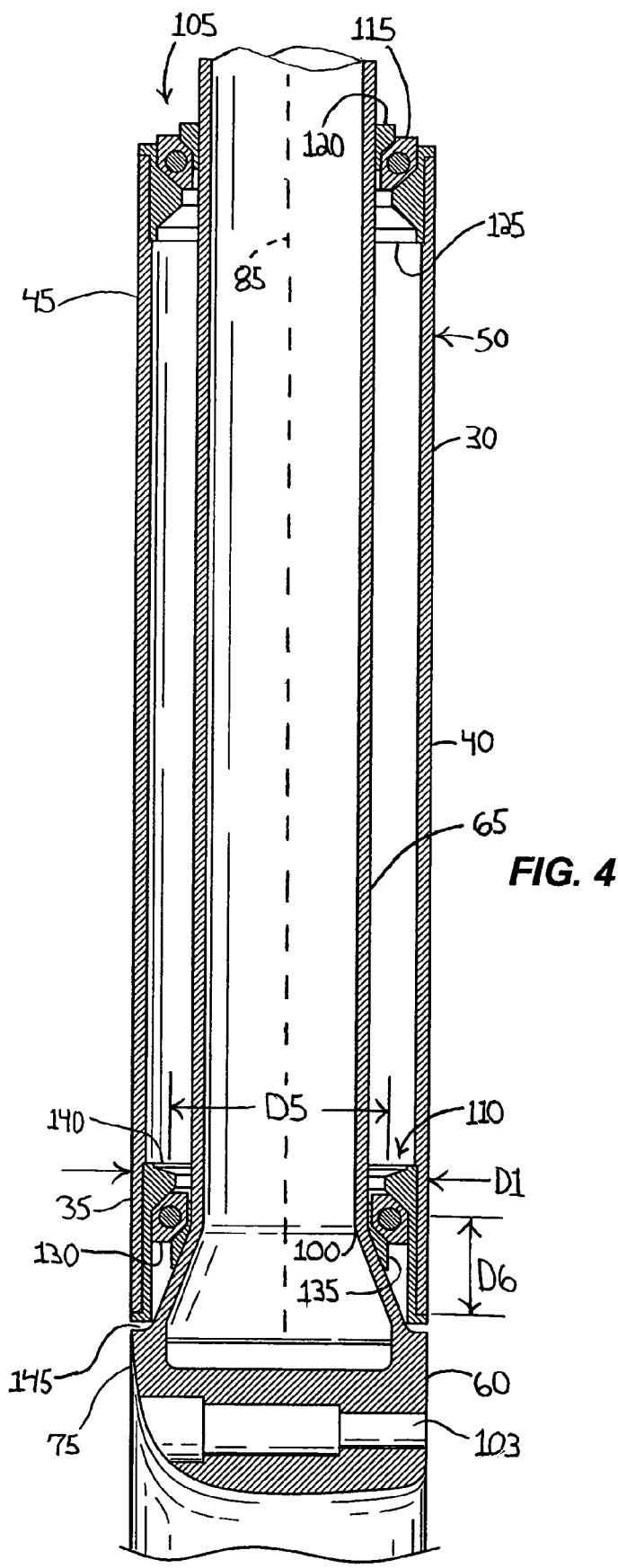
FIG. 4 is a cross-section of a portion of the bicycle taken along line 4-4 in FIG. 1.

Referring to FIGS. 2 and 4, the frame 25 includes a head tube 30 having an outer dimension D1 (47 mm in the illustrated embodiment). While the illustrated head tube 30 is cylindrical with a generally constant outer dimension D1, in other constructions the head tube 30 can have an outer dimension D1 that varies. For example, the outer dimension D1 of the head tube 30 may decrease from a lower portion 35 toward a center portion 40, then increase from the center portion 40 toward an upper portion 45. In yet other constructions, the head tube 30 can take shapes other than a cylinder. For example, the head tube 30 can have an outer surface 50 with a plurality of sides, such as three, four, or more sides, or the head tube can be aerodynamically shaped. For purposes of this patent application, the outer dimension D1 of the head tube 30 should be measured laterally across the lower portion 35 of the head tube 30.

A fork assembly 55 is received and supported by the head tube 30. The fork assembly 55 includes a fork 60 having a steerer tube 65, a transition 70, a fork crown 75, two fork blades 80, and two fork dropouts 82. The illustrated steerer tube 65, transition 70, fork crown 75 and fork blades 80 are integrally formed as a single piece made from a carbon/epoxy composite. Of course other materials such as plastics, fiberglass composite, KEVLAR composite, or other composites, and the like can be used to integrally form the steerer tube 65, transition 70, fork crown 75 and fork blades 80. In other constructions, the steerer tube 65, transition 70, fork crown 75 and fork blades 80 may not be integrally formed as a single piece. For example, in one construction the fork blades 80 can be made separate from the fork crown 75, and then the fork blades 80 can be bonded to the crown using epoxy or any suitable adhesive. In yet another construction, the steerer tube 65 can be formed separate from the transition 70 and then coupled to the transition using an adhesive, such as epoxy. Furthermore, the steerer tube 65, transition 70, fork crown 75, and fork blades 80 may not all be formed from composite material. In one such construction the transition 70 can be made from aluminum and the steerer tube 65 and fork crown 75 can be made from a composite material. Other various combinations of materials can also be utilized.

Figure 3:
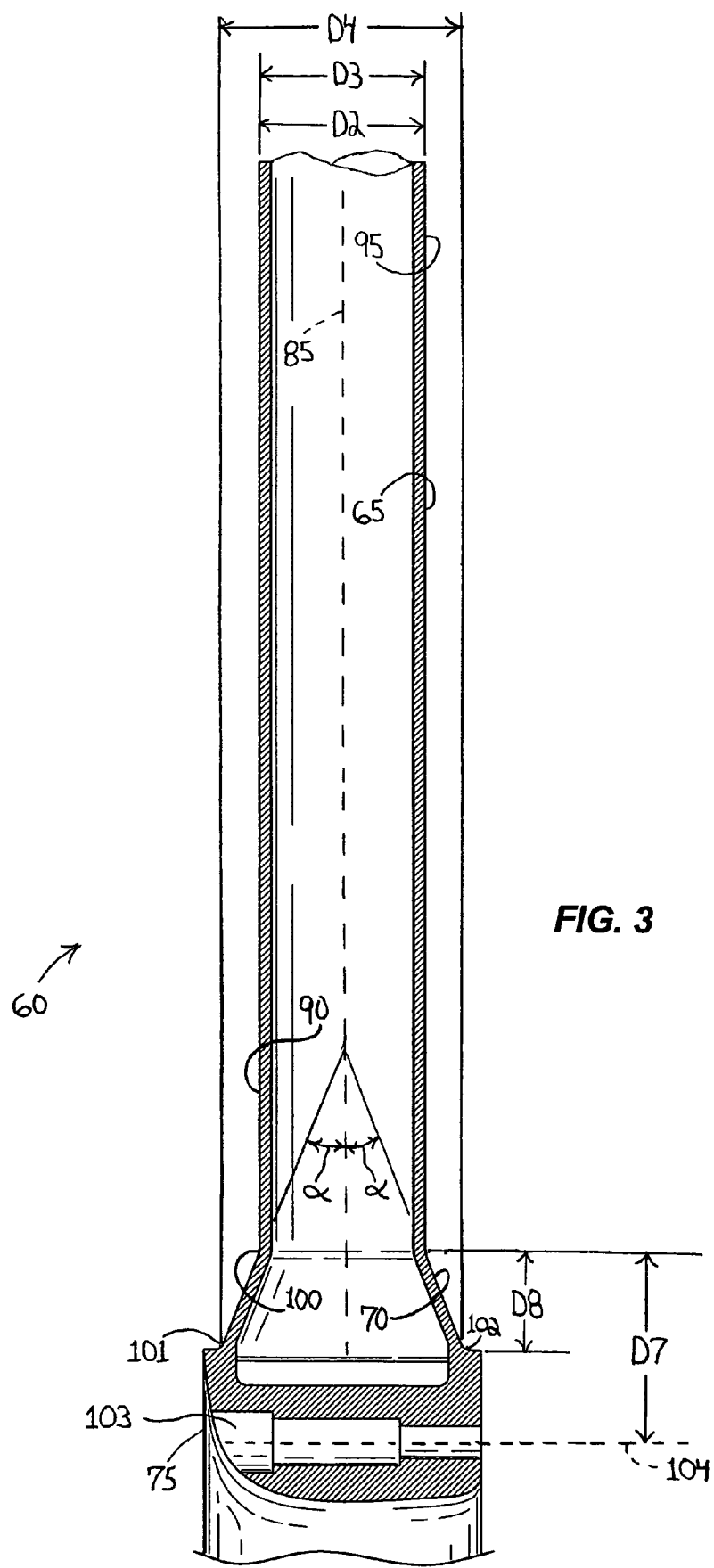
FIG. 3 is a cross-section of a portion of the fork assembly taken along line 3-3 in FIG. 1.

Referring to FIG. 3, the steerer tube 65 is generally cylindrical and defines a central axis 85. While the illustrated steerer tube 65 is cylindrical in shape, in other constructions the steerer tube 65 can be frustoconical, such that an outer dimension D2 (29 mm in the illustrated embodiment) of the steerer tube 65 either increase or decreases from a lower portion 90 toward an upper portion 95. Furthermore, while the illustrated steerer tube 65 is hollow with a uniform wall thickness, in other constructions the wall thickness may not be uniform. For example, in other constructions the wall thickness can decrease from the lower portion 90 toward the upper portion 95.

Referring to FIGS. 2 and 3, the transition 70 extends from the fork crown 75 to couple the fork crown 75 to the steerer tube 65. An upper transition point 100 is defined by the location where the transition 70 couples to the steerer tube 65, and lower transition point 101 is defined by the location where the transition 70 couples to the fork crown 75. The transition 70 has a first outer dimension D3 (29 mm in the illustrated embodiment) at the upper transition point 100 and a second outer dimension D4 (40 mm in the illustrated embodiment) where the transition 70 couples to the fork crown 75 at the lower transition point 101. While the illustrated fork 60 includes a radius portion 102 located between lower transition point 101 and the fork crown 75, in other constructions the fork 60 may omit the radius portion 102. Therefore, for purposes of this patent application, the lower transition point 101 will be defined as the point where the transition 70 couples to the radius portion 102, or in embodiments that omit the radius portion 102, the lower transition point 101 will defined as the point where the transition 70 couples to the crown 75.

In the illustrated embodiment, the first outer dimension D3 of the transition 70 is equal the outer dimension D2 of the steerer tube 65 at the upper transition point 100, and the first outer dimension D3 of the transition 70 increases from the upper transition point 100 toward the fork crown 75. A ratio is defined by the second outer dimension D4 of the transition 70 divided by the first outer dimension D3 of the transition 70. In the illustrated construction, the ratio is about 1.4, and in other constructions the ratio is greater than about 1.2.

The frustoconical outer surface of the transition 70 defines an angle $\alpha$ between the outer surface of the transition 70 and the central axis 85 of the steerer tube 65. The illustrated angle $\alpha$ is about 20 degrees, and in other constructions, the angle $\alpha$ is greater than about 10 degrees. While the illustrated transition 70 is frustoconical in shape, in other constructions, the transition can have a plurality of sides. For example, in other constructions, the transition can have three, four, or more sides.

Referring to FIGS. 2 and 4, the fork assembly 55 also includes an upper bearing assembly 105 and a lower bearing assembly 110. The upper bearing assembly 105 includes an upper bearing 115, a compression ring 120, and an upper cup 125. The upper cup 125 is rotationally fixed with respect to the head tube 30 and supports the upper bearing 115 within the head tube 30. The compression ring 120 is located between the steerer tube 65 and the upper bearing 115 and is generally fixed with respect to the steerer tube 65. The upper bearing 115 is located between the upper cup 125 and compression ring 120 and provides for relative rotation between steerer tube 65 and the head tube 30. The upper bearing 115 can be any suitable bearing, such as a loose ball bearing, a retainer ball bearing, a cartridge type bearing, and the like.

Referring to FIG. 3, the fork crown 75 includes a brake mount in the form of an opening 103 extending through the fork crown 75 and defining a brake-mounting axis 104. The function and operation of the opening 103 is well known to one of ordinary skill in the art. It should be understood that other types of brake mounts could be used with the present invention.

The lower bearing assembly 110 includes a lower bearing 130, a crown race 135, and a lower cup 140. The crown race 135 can be made from any suitable material, such as aluminum, steel, plastic, composite, etc. The crown race 135 is coupled to the fork 60 circumferentially around the upper transition point 100 such that the crown race 135 is fixed with respect to the fork 60. In the illustrated construction, the crown race 135 is co-molded to the fork 60, while in other constructions the crown race 135 can be bonded to the fork 60.

The lower cup 140 is coupled to the head tube 30, such that the lower cup 140 is rotationally fixed with respect to the head tube 30. The lower cup 140 can be made from any suitable material, such as aluminum, steel, plastic, composite, etc.

The lower bearing 130 is located between the crown race 135 and the lower cup 140, such that the lower bearing 130 is circumferentially around the upper transition point 100. The lower bearing 130 can be any suitable bearing, such as a loose ball bearing, a retainer ball bearing, a cartridge type bearing, and the like. The illustrated lower bearing 130 has a diameter D5 of approximately 36 mm. In other constructions, the lower bearing 130 can have any suitable diameter D5.

The illustrated lower bearing 130 is located at a distance D6 from an end of the head tube 30. In the illustrated construction, the distance D6 is approximately 15 mm and in other constructions is at least about 8.5 mm. In yet other constructions, the lower bearing 130 can be located either above or below the upper transition point 100.

The upper transition point 100 and the lower bearing 130 are located at a distance D7 from the brake-mounting axis 104. In the illustrated embodiment, this distance D7 is 33 mm for the upper transition point 100 and 35 mm for the lower bearing 130. In addition, the upper transition point 100 and the lower bearing 130 are located at a distance D8 from the lower transition point 101 (essentially, the length of the transition 70). In the illustrated embodiment, this distance D8 is 16 mm for the upper transition point 100 and 18 mm for the lower bearing 130.

A ratio is defined by the distance D6 from the end of the head tube 30 to the lower bearing 130 divided by the outer dimension D1 of the head tube 30. In the illustrated embodiment, the ratio is about 0.33. In other embodiments, the ratio is at least about 0.28 and in yet other embodiments the ratio is at least about 0.23.

A second ratio is defined by the distance D6 from the end of the head 30 to the lower bearing 130 divided by the diameter D5 of the lower bearing 130. In the illustrated embodiment, the ratio is about 0.42. In other embodiments, the ratio is at least about 0.30 and it yet other embodiments the ratio is at least about 0.25.

A third ratio is defined by the distance D7 from the brake-mounting axis 104 to the lower bearing 130 divided by the diameter D5 of the lower bearing 130. In the illustrated embodiment, the third ratio is about 0.97. In other embodiments, the third ratio is at least about 0.8 and preferably at least about 0.7.

A fourth ratio is defined by the distance D7 from the brake-mounting axis 104 to the lower bearing 130 or the upper transition point 100 divided by the dimension D4 of the transition 70 at the lower transition point 101. In the illustrated embodiment, the fourth ratio is about 0.81. In other embodiments, the fourth ratio is at least about 0.63 and preferably at least about 0.5.

A fifth ratio is defined by the distance D7 from the brake-mounting axis 104 to the lower bearing 130 or the upper transition point 100 divided by the outer dimension D1 of the head tube 30. In the illustrated embodiment, the fifth ratio is about 0.70. In other embodiments, the fifth ratio is at least about 0.60 and preferably at least about 0.50.

The upper and lower bearing assemblies 105, 110 allow the steerer tube 65 to rotate with respect to the head tube 30 while maintaining the steerer tube 65 in a generally fixed location with respect to the head tube 30 in both axial and radial directions. The upper and lower bearing assemblies 105, 110 also position the fork 60 within the head tube 30 such that a gap 145 is formed between the lower cup 140 and the crown 75.

Referring to FIG. 1 the steerer tube 65 extends through and above the head tube 30 to provide an attachment point for a steering assembly 150. The steering assembly 150 includes a handlebar 155, a stem 160, and a sleeve 165. The stem 160 is coupled to the steerer tube 65 and retains the sleeve 165 that surrounds the steerer tube 65, between the stem 160 and the head tube 30. The sleeve 165 includes a cap (not shown) that covers the upper bearing assembly 105 to substantially prevent dirt, debris, liquid and the like from contacting the upper bearing 115. While the illustrated upper bearing assembly 105, stem 160, and sleeve 165 are in a configuration similar to a conventional threadless headset, it should be understood that in other constructions a threaded headset can be utilized. In such a construction, an additional threaded nut is provided and the threaded nut is coupled to the steerer tube 65, which is also threaded, thereby coupling the stem 160 and sleeve 165 to the steerer tube 65.

Thus, the invention provides, among other things, a bicycle fork assembly 55 that includes an upper bearing assembly 105, a lower bearing assembly 110, and a fork 60. The fork 60 has two fork blades 80 that connect to form a fork crown 75. A transition 70 extends from the fork crown 75 to couple the fork crown 75 to a steerer tube 65. Various features and advantages of the invention are set forth in the following claims.

What is claimed is:

1. A bicycle fork and frame assembly comprising:
   a frame having a head tube, the head tube having an outer dimension;
   a fork including a fork crown and a steerer tube positioned in the head tube;
   an upper bearing; and
   a lower bearing having a diameter, the upper bearing and lower bearings configured to rotatably support the fork within the head tube, wherein the head tube includes a first end proximal to the fork crown and a second end distal to the fork crown, and a ratio is defined by a distance from the first end of the head tube to the lower bearing divided by the diameter of the lower bearing, and wherein the ratio is at least 0.25.

2. The bicycle fork and frame assembly of claim 1, wherein the ratio is at least 0.30.

3. The bicycle fork and frame assembly of claim 1, wherein the ratio is at least 0.40.

4. The bicycle fork and frame assembly of claim 1, further comprising a transition coupling the fork crown to the steerer tube and defining a transition point between the transition and the steerer tube, wherein the transition has an outer dimension that increases from the steerer tube toward the fork crown, and wherein the lower bearing is located adjacent to the transition point.

5. The bicycle fork and frame assembly of claim 4, wherein an outer dimension of the steerer tube at the transition point and an outer dimension of the transition at the transition point are substantially the same.

6. The bicycle fork and frame assembly of claim 4, wherein the steerer tube and the fork crown are an integrally formed piece of composite material.

7. A bicycle comprising:
   a frame having a head tube; and
   a fork including,
      a fork crown including a brake mount;
      a steerer tube; and
      a transition coupling the fork crown to the steerer tube and defining a transition point between the transition and the fork crown, wherein the transition has an outer dimension that increases from the steerer tube toward the fork crown;
   a lower bearing recessed within the head tube, the lower bearing configured to rotatably support the fork within the head tube,
   wherein the brake mount is a distance from the lower bearing, wherein a ratio is defined as the distance divided by an outer dimension of the transition at the transition point, and wherein the ratio is at least 0.5; and
   wherein the head tube includes a first end proximal to the fork crown and a second end distal to the fork crown, and wherein another ratio is defined by a distance from the first end of the head tube to the lower bearing divided by an outer dimension of the head tube, and wherein the other ratio is at least 0.23.

8. The bicycle of claim 7, wherein the ratio is at least 0.63.

9. The bicycle of claim 8, wherein the ratio is at least 0.8.

10. The bicycle of claim 7, wherein the other ratio is at least 0.28.

11. The bicycle of claim 7, wherein another ratio is defined by the distance from the brake mount to the lower bearing divided by an outer dimension of the head tube, and wherein the other ratio is at least 0.50.

* * * * *